No. 794,175. PATENTED JULY 11, 1905.
A. P. HALL.
LEVEL.
APPLICATION FILED AUG. 8, 1904.
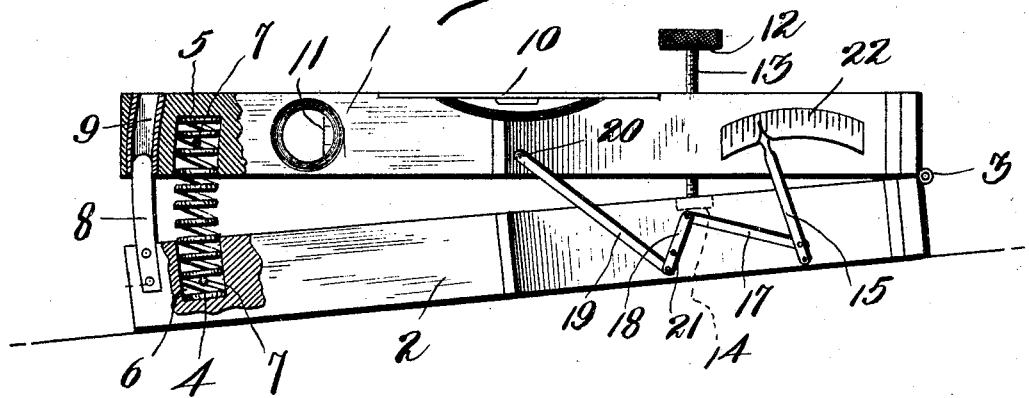
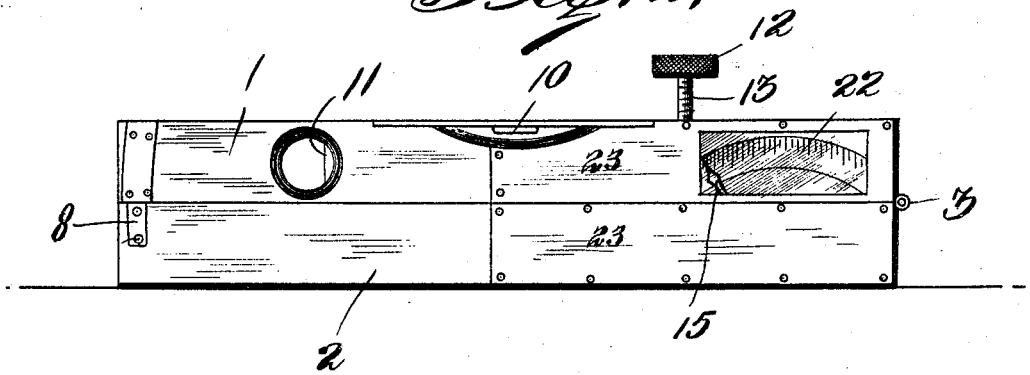
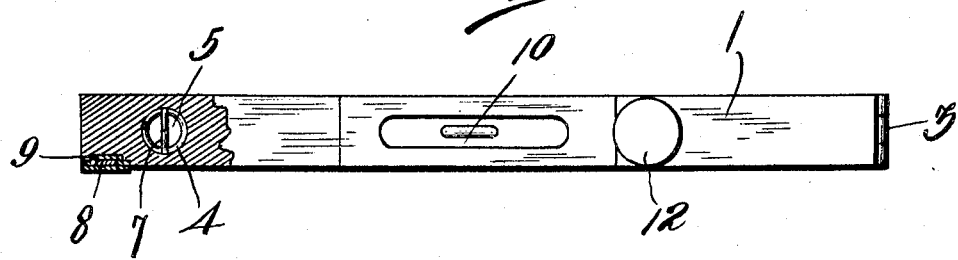
Witnesses
Jas. A. Koehl.
C. H. Gershauer.
Inventor
Alpheus P. Hall.
by H. B. Wilson
Attorney No. 794,175.

Patented July 11, 1905.

UNITED STATES PATENT OFFICE.

ALPHEUS P. HALL, OF GRAYVILLE, ILLINOIS.

LEVEL.

SPECIFICATION forming part of Letters Patent No. 794,175, dated July 11, 1905.

Application filed August 8, 1904. Serial No. 219,956.

*To all whom it may concern:*

Be it known that I, ALPHEUS P. HALL, a citizen of the United States, residing at Grayville, in the county of White and State of Illinois, have invented certain new and useful Improvements in Levels; and I do declare the following to be a full, clear, and exact description of the invention, such as will enable others skilled in the art to which it appertains to make and use the same.

This invention relates to levels of that type designed to indicate the fall or inclination per foot of surfaces which vary from a true horizontal plane, and one of the principal objects of the same is to provide an instrument of this character which will operate to indicate the degree of inclination from a true horizontal plane of any surface within the scope of the instrument.

Another object is to provide a combined level and plumb having means for indicating the fall of inclined surfaces and also providing means whereby the instrument may be quickly converted into an ordinary level or plumb, or both.

Still another object of the invention is to provide an instrument of this character which shall be comparatively simple in construction, not liable to get out of order, and which may be provided at slight cost considering the various purposes for which the instrument is available.

These and other objects are attained by means of the construction illustrated in the accompanying drawings, in which—

Figure 1 is a side view of an instrument constructed in accordance with my invention, the parts being shown extended to indicate the degrees of inclination per foot of an inclined surface and the cover-plates being removed to better illustrate certain parts. Fig. 2 is a side view of the instrument with the two members closed to form a level and plumb for ordinary use, and Fig. 3 is a plan view and partial section of the same.

Referring to the drawings for a more particular description of the invention, the numeral 1 designates the upper member, and 2 the lower member, of the instrument, said two members being connected together at one end by a hinge 3. At the opposite ends of the members 1 2 a spring 4 is seated in registering recesses 5 6 in the two members, said spring being expansible and secured in place at its opposite ends by the pins 7 or in any other suitable manner. A guide or keeper comprising an arcuate slide 8, consisting of a bar or rod, is secured at 9 to the lower member 2, the upper end of said slide or bar entering guide-plates 9, suitably secured in place to register with the slide upon the upper member 1. I may employ two such guides, one upon each side of the members 1 2, if found desirable.

10 is an ordinary spirit level or tube, and 11 is a plumb-tube, which may be of the ordinary or any suitable construction. A thumb-screw 12, having a shank 13, which passes through the upper member 1 and is seated in a suitable guide 14 in the lower member, is provided for the purpose of moving the two members 1 2 toward each other at the open end. To indicate automatically the inclination of the lower member relatively to a horizontal plane indicated by the level and plumb tubes, I employ an indicator, which will now be described.

Pivoted at its lower end to the member 2 is a hand or pointer 15, said hand being connected to a pivot-link 17, said link being connected at its opposite end to a lever 18, said lever 18 being pivoted to a link 19, said link 19 being connected by a pivot 20 to the upper member 1. The lever 18 is pivoted to the member 2 at 21. It will be noted that the pivot-pin 20 is immediately under the center of the level-bead 10. A dial 22, provided with a graduated scale, is seated in a recess, and a glass cover is placed over the dial, the hand or pointer 15 having sufficient space between the dial and glass cover to move freely. This system of levers or links connected to the hand or pointer 15 is covered, by means of plates 23, to protect said levers from injury in use.

From the foregoing it will be obvious that when the lower member 2 is placed upon an inclined surface and the upper member 1 has been adjusted to indicate a true horizontal plane by means of the level-tube, the thumb-screw 12 being operated to secure such adjustment, the system of links and levers connected to the hand or pointer 15 will move said hand or pointer across the face of the dial to a point commensurate with the distance between the two members at the opposite end from the hinge. The hand or pointer will thus indicate the number of inches per foot of the inclination upon which the member 2 rests.

My invention will be found exceedingly convenient in making calculations in various classes of work, and in view of its automatic character and the fact that it may be used as an ordinary level or plumb said instrument should be found available for many classes of artisans, surveyors, engineers, and many others.

Having thus described my invention, what I claim as new, and desire to secure by Letters Patent, is—

1. A level comprising two members hinged together, said two members being connected by a spring and slide at one end, a dial near the opposite end, a hand or pointer, a system of levers to which said hand or pointer is connected, said levers adapted to move the hand when the members are separated at one end, one of said members being provided with a level-tube and an adjusting-screw connecting the two members, substantially as described.

2. A level comprising two members hinged together at one end, and connected near their opposite ends by a spring and slide, a hand or pointer, a dial, and a system of links and levers connected to the two members and to the hand or pointer for moving the latter across the dial when one of said members is moved relatively to the other, substantially as described.

3. In an instrument for indicating the degrees of inclination of a surface relatively to a horizontal plane, the combination of two members, one provided with a level-tube and a plumb-tube, said two members being hinged at one end and connected together by an adjusting-screw, and an indicator hand or pointer pivoted to one of the members and connected by levers to the other member, whereby said hand or pointer is movable across the face of a dial by the movement of the two members toward and from each other, and a dial on one of said members, substantially as described.

In testimony whereof I have hereunto set my hand in presence of two subscribing witnesses.

ALPHEUS P. HALL.

Witnesses:
   CHAS. L. SCOTT,
   FRED MILNER.